United States Patent [19]

Kuster et al.

[11] Patent Number: 5,380,575
[45] Date of Patent: Jan. 10, 1995

[54] VERTICALLY ADJUSTABLE LATERAL GLASS PANE FOR AUTOMOBILES

[75] Inventors: Hans-Werner Kuster; Franz Krämling; Friedrich-Wilhelm Berndsen, all of Aachen, Germany

[73] Assignee: Saint-Gobain Vitrage International, Courbevoie, France

[21] Appl. No.: 15,838

[22] Filed: Feb. 10, 1993

[30] Foreign Application Priority Data

Feb. 10, 1992 [DE] Germany ............................. 4203752

[51] Int. Cl.$^6$ ................... B32B 9/06; C03C 27/12
[52] U.S. Cl. ................... 428/98; 296/84.1; 296/89; 428/192; 428/212; 428/213; 428/215; 428/220; 428/410; 428/426; 428/437
[58] Field of Search ............... 428/98, 192, 212, 213, 428/215, 220, 426, 437, 410; 52/171; 296/146 R, 89, 84.1

[56] References Cited

U.S. PATENT DOCUMENTS

| | | | |
|---|---|---|---|
| 3,558,415 | 1/1971 | Rieser | 428/437 |
| 3,592,726 | 7/1971 | Blizard | 428/437 |
| 4,075,381 | 1/1978 | Furukawa | 428/437 |
| 5,198,304 | 3/1993 | Kramling | 428/437 |

FOREIGN PATENT DOCUMENTS

| | | | |
|---|---|---|---|
| 4027035 | 3/1992 | Germany . | |
| 1359170 | 7/1974 | United Kingdom | 428/437 |

*Primary Examiner*—Ellis P. Robinson
*Assistant Examiner*—Nasser Ahmad
*Attorney, Agent, or Firm*—Oblon, Spivak, McClelland, Maier & Neustadt

[57] ABSTRACT

A vertically adjustable glass pane for automobiles, especially a door window pane, is of laminated glass consisting of two thermally toughened single glass sheets, each 1.5 to 3 mm thick, and of a thermoplastic intermediate layer. Both the glass sheets have, in their edge region, tensile stresses in the core having a value from 27 to 57 MN/m$^2$ for a sheet thickness of 1.5 mm and 20 to 47 MN/m$^2$ for a sheet thickness of 3 mm. In the middle area within the peripheral region the glass sheets have tensile stresses in the core which, in the case of a glass sheet of 1.5 mm thickness, have values of 25 to 42 MN/m$^2$ and, with a glass thickness of 3 mm, values of 17.5 to 33 MN/m$^2$. Laminated glass panes of this type have a comparatively high strength in the peripheral region and low strength in the middle area. They possess excellent properties both from a structural design standpoint and also from the standpoint of safety in case of accident.

3 Claims, 1 Drawing Sheet

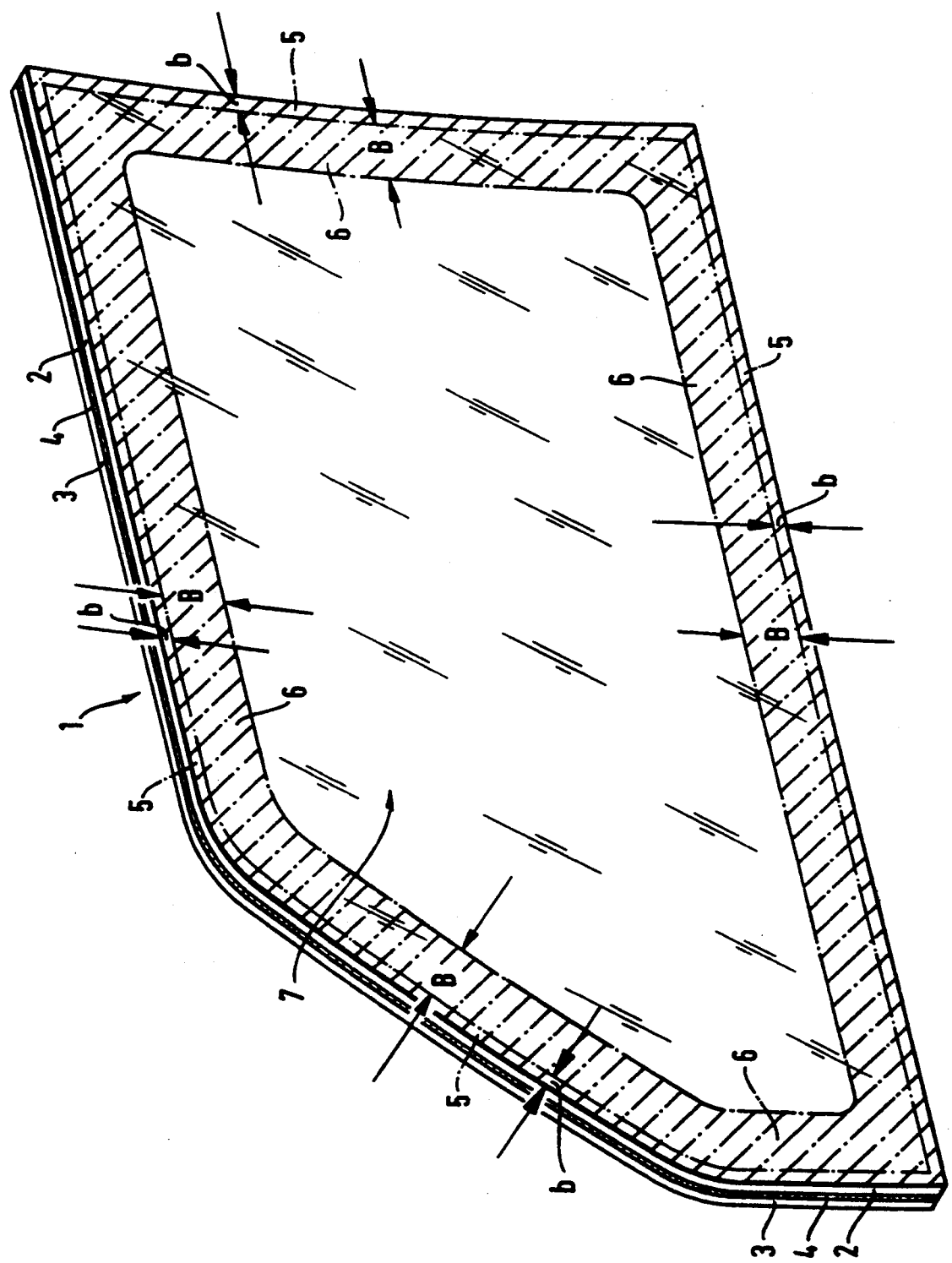

VERTICALLY ADJUSTABLE LATERAL GLASS PANE FOR AUTOMOBILES

BACKGROUND OF THE INVENTION

Field of the Invention

This invention relates to an automobile glass pane, especially a vertically adjustable side pane of laminated glass composed of two thermally toughened single glass sheets, bonded together by a thermoplastic intermediate layer.

Description of the Related Art

An automobile glass pane which can be lowered of this type is known from DE-GM 89 10 916. In this known lateral pane, the outer glass sheet of the laminated glass pane has a thickness of 3 to 4 mm and possesses, as a whole, the usual prestress of a monolithic safety glass pane. The inner glass sheet of the laminated pane has a thickness of 1.5 to 2.5 mm and has no, or very little, prestress. The inner glass sheet also has smaller dimensions than the outer, prestressed glass sheet, and the projecting edge region of the prestressed outer glass sheet serves for guiding the laminated pane in the guide rails of the window frame. The two glass sheets are bonded together by means of a film of thermoplastic 0.8 to 2.0 mm thick.

This known glass pane, as a consequence of its construction, is to a large extent burglar-proof and also has good acoustic insulation properties. The burglar-resistant and penetration-resistant effect is based both upon the relatively thick thermoplastic intermediate layer and upon the feature that the not, or only slightly, prestressed inner glass is not destroyed even if the outer toughened glass sheet is destroyed, due to the thick intermediate film or, in the case of destruction, breaks only into very large fragments so that the window opening in all cases remains closed. This means, however, that even in those cases in which it is necessary to break through the side window panes, namely in the case of an accident, the high resistance of this known lateral glass pane impedes rapid breakage and thereby rapid access to the occupants of the automobile.

In DE-P 40 27 035, which is not admitted to be prior art except as required under 35 U.S.C. 102, each glass sheet in an automobile glass pane of laminated glass has a thickness of 2.0 to 3.0 mm and a prestress lower than the prestress of monolithic safety glass and varying over the area of the glass sheet in such a way that, all around in the edge region, the average tensile stress in the core is 5 to 15% lower than the tensile stress required for breakage behavior in accordance with the standards for the same thickness of pane and that, in the region of the pane area within this edge region, the average tensile stress in the core is 20 to 40% lower than the tensile stress required for breakage behavior in accordance with the standards for the same thickness of pane.

Corresponding to these lower prestress values, which differ from the edge to the central region in these laminated glass panes, the tensile stresses in the core, for a thickness of the glass sheets of 2.0 mm, are 54 to 76 MN/m² in the edge region and, with increasing thickness, decrease linearly to 46.7-71.2 MN/m² for a sheet thickness of 3 mm, and in the central region, for a glass sheet 2 mm thick, have the values 38 to 64 MN/m² and decrease linearly with increasing thickness down to 33-60 MN/m² for a sheet thickness of 3.0 mm.

A laminated glass pane having this stress arrangement of its individual glass sheets has the advantageous characteristic that compared with a laminated glass pane of fully prestressed glass sheets, the strength in the middle area of the laminated pane has been reduced to a sufficient extent that, in emergency, the laminated glass pane can be pressed inwards from outside and thus the window opening can be exposed comparatively quickly. Whereas the central region of the two single glass sheets of the laminated glass pane then breaks into very large pieces, and the edge zone disintegrates into comparatively small fragments, which facilitates the removal of the laminated pane from its mounting. The reduction in the strength in the central zone also has a favorable effect, in the case of collision accidents, upon the biomechanical properties of the laminated glass pane, whereas the comparatively higher prestress in the edge zone has the favorable effect that the laminated pane withstands the higher mechanical loadings in the edge region without problems.

SUMMARY OF THE INVENTION

An object of the present invention is to further improve an automobile glass pane of this type, which can be used particularly as a vertically adjustable side pane, from the aspect of its safety properties.

The laminated glass pane according to this invention in characterized in that each of the single glass sheets has a thickness of 1.5 to 3.0 mm and a prestress that is lower than the prestress of monolithic safety glass and varies over the area of the sheet in such a way that, around the peripheral zone, the average tensile stress in the core is 15 to 65% lower than the tensile stress required for a breakage behavior in accordance with the standards for a sheet of the same thickness, and that, in the region of the pane area within this peripheral zone, the average tensile stress in the core is 40 to 70% lower than the tensile stress required for a breakage behavior in accordance with the standards for the same thickness of sheet.

It has been found that, in laminated glass panes having prestress values further reduced in this manner, the increased strength in the edge zone is quite sufficient for practical requirements, but the biomechanical properties and the facility, in emergency, of forcing in the glass pane without the use of tools, are further improved. It has also been found that the further reduction in the prestress according to this invention is advantageous in that the prestressing of glass sheets having a thickness cf less than 2 mm, normally difficult to carry out, is thereby simplified, so that laminated glass panes having a further reduced total thickness can be produced in a comparatively simple manner.

It will be understood that in the edge region of the glass sheets the tensile stress zone in the core must not extend right up to the peripheral surface of the glass sheet, because this would lead to a high edge sensitivity of the sheet. In the immediate edge region, that is to say in a zone having a width of about once to twice the sheet thickness, compressive stresses must occur throughout the entire thickness of the sheet, which as a rule is achieved by the glass sheets being cooled in accelerated manner on the peripheral surfaces. The edge zone defined according to this invention having tensile stresses in the core of the glass sheet is therefore that edge zone which adjoins this narrow, extreme edge zone.

Taking into account the thickness of the single glass sheets, which according to this invention are given a defined prestress, the tensile stresses in the core of the glass sheet, in the peripheral region, for a glass sheet thickness of 1.5 mm, have a value from 27.5 to 57 $MN/m^2$ and decrease linearly with increasing thickness of the glass sheet to 20–47 $MN/m^2$ for a glass sheet thickness of 3 mm, while the tensile stresses in the core of the sheet in the central zone of the glass sheet, for a sheet thickness of 1.5 mm, have a value of 25–42 $MN/m^2$ and decrease linearly to 17.5–33 $MN/m^2$ with increasing sheet thickness to 3 mm.

If it is assumed that a ratio of the absolute numerical values of about 1:2 exists between the tensile stresses in the core and the compressive stresses at the surfaces of the glass sheet, then it follows that the compressive stresses at the surface in the edge region decrease from values of 55–114 $MN/m^2$ for sheets 1.5 mm thick to 40–94 $MN/m^2$ for glass sheets 3 mm thick, and decrease in the central area from 50–84 $MN/m^2$ for glass sheets 1.5 mm thick down to 35–66 $MN/m^2$ for glass sheets 3 mm thick, the decreases being linear in each case.

Automobile glass panes as a rule are curved glass panes. Since the individual glass sheets must each be separately toughened (prestressed), the single glass sheets must also be individually bent, in contrast to the usual production process for laminated glass panes. This imposes special requirements upon the accuracy and reproducibility of the bending methods used for the purpose of this invention. The prestressing process which follows the bending process must be carried out in such a manner that in the edge region of the glass pane a sufficiently more pronounced cooling must take place for the higher prestressing values desired, by comparison with the central area of the glass panes, to be achieved.

Very thin single glass sheets can be bent and prestressed with particular advantage by a bending pressing methods in which the bending and simultaneous prestressing take place with the help of cooled pressing molds, and in which the edge zones are subjected to a more pronounced cooling. A method of this type and suitable devices for this purpose are described in detail in EP 0 277 074 and EP 0 404 677.

The width of the more highly prestressed edge zone should at most be 3 cm, preferably about 1 to 2 cm.

For the thermoplastic intermediate film of the laminated glass pane, the usual films of polyvinyl butyral of, for example, 0.76 mm thickness, and also appropriate films of thermoplastics polyurethane, which are commercially available, have proved satisfactory. If desired, it is also possible to use thermoplastic films of this type having a commercial thickness of 0.38 mm. The glass sheets may be dyed throughout their volumes in order to increase the absorption of thermal radiation and/or be provided with thermal radiation-reflecting surface coatings.

The tensile stresses in the core of the glass sheets can be measured by means of the laser scattered light method, which has been described in the publication "XV INTERNATIONAL CONGRESS ON GLASS, Leningrad 1989, PROCEEDINGS, volume 3b, pp 217–220".

The stress pattern according to this invention can be created, when toughening with blown air using the known toughening devices, by varying the process parameters such as air pressure and distance of the blowing nozzles from the glass sheet and also the geometrical arrangement of the blowing boxes according to the fracture pattern to be obtained in each case, until the desired stress values are achieved. Suitable measures must be adopted here to ensure that the heat removal in the edge region of the glass sheets is correspondingly greater than in the region of the sheet surface. In the case of a glass sheet produced with the thus determined process parameters, the stresses in the central region and in the edge region can be measured by the laser scattered light method and the final fine adjustment of the process parameters carried out.

BRIEF DESCRIPTION OF THE DRAWING

The sole Figure is a perspective view of a laminated glass pane which is prestressed according to the invention, showing the different prestressed regions.

DETAILED DESCRIPTION OF THE PREFERRED EMBODIMENT

In the drawing, a laminated glass pane 1 having the features according to this invention is illustrated in a perspective view. The laminated glass pane 1 has a slightly cylindrically curved form and serves as a door window pane mounted to be raised and lowered. It consists of the inner glass sheet 2 and the outer glass sheet 3, which are bonded to each other with the application of heat and pressure by means of an intermediate layer 4 of polyvinyl butyral, 0.76 mm thick.

The two glass sheets 2 and 3 are individually bent and simultaneously toughened with the water-cooled press described in European Patent Application 0 404 677. The varied cooling action exerted by the pressing molds upon the edge region and upon the central region of the glass sheet is achieved by an appropriate form of construction of the pressing molds and arrangement and dimensioning of the cooled zones of these pressing molds.

The thus bent and prestressed glass sheets 2 and 3 each have a thickness of 2.1 mm and have the stress pattern according to this invention. In the extreme edge zone 5, the width b of which is approximately 3 mm, compressive stresses act exclusively throughout the entire sheet thickness, that is to say also in the central plane of the glass sheets. In the peripheral edge region 6, having a width B of approximately 1.5 cm, adjoining this edge zone 5, the mean tensile stresses in the core are approximately 38 $MN/m^2$, and in the middle region 7 inside the edge region 6, the tensile stresses in the core are approximately 33 $MN/m^2$. The laminated glass pane 1 has excellent properties, both in respect to its suitability for series production and also with regard to its safety during travel and in accidents, from the biomechanical standpoint.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vehicle glass pane of laminated glass comprising two thermally toughened single glass sheets bonded together via a thermoplastic intermediate layer, wherein each of the two glass sheets has a thickness of 1.5 to 3.0 mm and a prestress lower than a prestress of a monolithic safety glass, the prestress of each of the two glass sheets each varying across the area of the sheet in such a manner that at a first peripheral edge region of the glass sheet the mean tensile stress in the core of each sheet is 15 to 65% lower than the tensile stress necessary for breakage behavior in accordance with the standards for a sheet of the same thickness, and wherein in the region of the pane area inside the first peripheral edge region, the mean tensile stress in the core of each sheet is 40 to 70% lower than the tensile stress necessary for breakage behavior in accordance with the standards for a sheet of the same thickness, the glass pane further including a second peripheral edge region disposed such that said first peripheral edge region is inside of said second peripheral edge region, and wherein said second peripheral edge region having a width of about one to two times the thickness of the glass pane, includes only compressive stresses in the core of each sheet.

2. The glass pane of claim 1, wherein compressive stresses act throughout the entire thickness of said glass pane in said second peripheral edge region.

3. A vehicle glass pane of laminated glass comprising two thermally toughened single glass sheets bonded together via a thermoplastic intermediate layer, wherein each of the two glass sheets has a thickness of 1.5 to 3.0 mm and a prestress lower than a prestress of a monolithic safety glass, the prestress of each of the two glass sheets each varying across the area of the sheet in such a manner that at a first peripheral edge region of the glass sheet the mean tensile stress in the core of each sheet is 15 to 65% lower than the tensile stress necessary for breakage behavior in accordance with the standards for a sheet of the same thickness, and wherein in the region of the pane area inside the first peripheral edge region, the mean tensile stress in the core of each sheet is 40 to 70% lower than the tensile stress necessary for breakage behavior in accordance with the standards for a sheet or-the same thickness, the glass pane further including a second peripheral edge region disposed such that said first peripheral edge region is inside of said second peripheral edge region, and wherein the core of each sheet in said second peripheral edge region does not include a tensile prestress said second peripheral edge region having a width which is about one to two times the thickness of the glass pane.

* * * * *